United States Patent [19]
Tate

[11] Patent Number: 5,442,984
[45] Date of Patent: Aug. 22, 1995

[54] SHEET MATERIAL TABLE AND CUTTING GUIDE ASSEMBLY

[76] Inventor: Terrance Tate, 31158 Del Rey Rd., Temecula, Calif. 92591

[21] Appl. No.: 164,400

[22] Filed: Dec. 9, 1993

[51] Int. Cl.⁶ .............................................. B26D 7/26
[52] U.S. Cl. ................................... 83/471.2; 83/574; 83/468.1; 83/486.1; 144/287; 269/1
[58] Field of Search ................. 83/471.2, 574, 474, 83/467.1, 486, 468.1, 1 C, 286 A; 269/901, 289 MR, 79, 1; 144/10, 286 A

[56] References Cited

U.S. PATENT DOCUMENTS

| | | | |
|---|---|---|---|
| 1,973,179 | 9/1934 | Schwerin et al. | 144/286 R |
| 2,240,395 | 4/1941 | Evans | 144/286 R |
| 2,711,194 | 6/1955 | Fisher . | |
| 2,818,892 | 1/1958 | Price . | |
| 2,990,859 | 7/1961 | Ruben | 83/477 |
| 3,109,640 | 11/1963 | Schneckloth | 269/73 |
| 3,389,724 | 6/1968 | Paul | 269/1 |
| 4,018,120 | 7/1977 | Pastore | 83/486 |
| 4,154,435 | 5/1979 | Alessio | 269/901 |
| 4,350,066 | 9/1982 | Volk | 83/574 |
| 4,465,114 | 8/1984 | Schumacher | 83/574 |
| 4,494,591 | 1/1985 | Folkerth | 144/286 A |
| 4,522,098 | 6/1985 | Bliss | 83/745 |
| 4,566,510 | 1/1986 | Bartlett et al. | 83/477.2 |
| 4,660,450 | 4/1987 | Rafalow | 83/467 R |
| 4,723,769 | 2/1988 | Nilsson | 269/79 |
| 4,733,704 | 3/1988 | Wolff | 144/286 R |
| 4,815,395 | 3/1989 | Trueg | 108/112 |
| 4,860,807 | 8/1989 | Vacchiano | 144/286 R |
| 4,995,288 | 2/1991 | DellaPolla | 83/574 |

FOREIGN PATENT DOCUMENTS 1146645  4/1963  Germany .

*Primary Examiner*—Eugenia Jones
*Assistant Examiner*—Allan M. Schrock
*Attorney, Agent, or Firm*—Gene Scott

[57] ABSTRACT

A table and guide assembly is described having a structure for supporting a circular saw or other tool, for moving in two degrees of freedom across a workpiece. The table is tiltable for mounting or dismounting the workpiece and provides means for moving the tool mechanically with accurate linear motion. The table can be mounted onto a truck or other vehicle for use in the field.

6 Claims, 5 Drawing Sheets

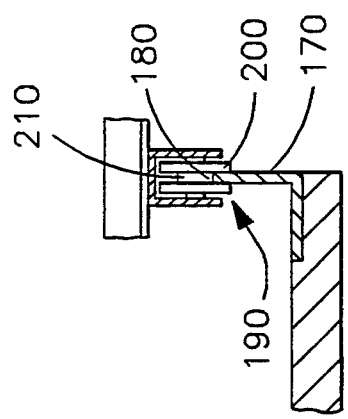
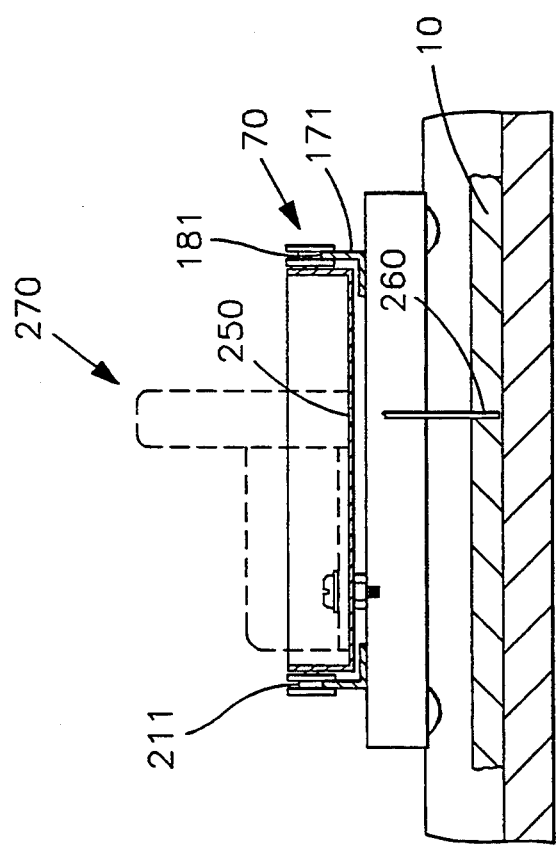

SHEET MATERIAL TABLE AND CUTTING GUIDE ASSEMBLY

FIELD OF THE INVENTION

This invention relates generally to work holders and, more particularly, to a work holder for cutting sheet material.

BACKGROUND OF THE INVENTION

Woodworking tables and guides are well known in the prior art, and are described in such patents as U.S. Pat. No. 4,995,288 to DellaPolla on Feb. 26, 1991; U.S. Pat. No. 4,860,807 to Vacchiano on Aug. 29, 1989; U.S. Pat. No. 4,815,395 to Trueg on Mar. 28, 1989; U.S. Pat. No. 4,733,704 to Wolff on Mar. 29, 1988; and U.S. Pat. No. 4,494,591 to Folkerth on Jan. 22, 1985. Several of the prior art devices teach a table top that tilts, but not for the purposes of facilitating loading of the workpiece. Several of the prior art devices are described as portable. Others of the prior art are described as versatile, being able to cut a workpiece in a variety of different ways. Others of the prior art are described as precise. None of the prior art devices, however, includes all of these advantages at once. As such, there is a need for such a device.

Clearly there is a need for a table based tool that is very inexpensive and simple to build, is highly portable, being usable in the field as well as in a fixed location such as a woodworking shop, has the flexibility to move the work surface to various angles between horizontal and vertical, and enables accurate and repeatable cuts in both rip and crosscut modes. The needed invention would have the ability to mount and dismount the workpiece with respect to the cutting surface without lifting it, making it easier to use.

Such a needed device would have a relatively simple structural means for holding a tool in either of two alternate operating directions and to provide means by which the direction of use of the tool may be quickly and easily changed, and by which the tool may be brought to bear upon the workpiece to produce highly accurate and repeatable work results. The present invention fulfills these needs and provides further related advantages over the prior art.

SUMMARY OF THE INVENTION AND OBJECTS

The instant invention is a highly adaptable saw table and workpiece support. It is generally designed for use in cutting sheets of wood in either rip or crosscut modes, and can produce superior results in accuracy of cut and in producing parallel cuts. The invention is reliable in reproducing identical cuts on alternate workpieces so that a series of workpieces may be finished with dimensions holding close tolerance across the bunch.

The table and guide includes a flat table having rails along each of two opposite sides. A transverse carriage assembly is mounted so as to span the table between the two rails, and is adapted to roll on these rails such that the assembly remains at right angles to the rails. The transverse carriage assembly, itself, has a second set of rails for guiding a saw carriage which supports a rotary blade saw or other working tool.

The transverse carriage assembly may be temporarily clamped at any desired location along the table rails so that the saw carriage may be pushed along the transverse carriage assembly to complete a cross cut operation. The saw carriage may also be positioned on the transverse carriage assembly such that the saw blade will rip the workpiece. In this mode, the saw carriage is locked in a desired place on the transverse carriage assembly while the transverse carriage assembly, itself, is moved over the table rails.

The objects which the instant invention admirably meets include producing a table based tool that is very inexpensive and simple to build, is highly portable, being usable in the field as well as in a fixed location such as a woodworking shop, has the flexibility to move the work surface to various angles between horizontal and vertical, and enables accurate and repeatable cuts in both rip and crosscut modes. An important object of the invention is the ability to mount and dismount the workpiece with respect to the cutting surface without lifting it. This is accomplished through tilting of the table, the table being slidably mounted onto the base. A further important object of the invention is to provide a simple structural means for holding a tool in either of two alternate operating directions and to provide means by which the direction of use of the tool is quickly and easily changed, and by which the tool may be brought to bear upon the workpiece to produce highly accurate and repeatable work results.

These and other objects and advantages of the present invention are provided in the following detailed description with reference to the drawings.

BRIEF DESCRIPTION OF THE DRAWINGS

The accompanying drawings illustrate the invention. In such drawings:

FIG. 3 is an elevational view of the present invention showing the relationship between the saw carriage assembly, the workpiece, the saw, and the table;

FIG. 4 is an elevational view in cross section of the rolling interrelationship between the transverse carriage assembly and the table rails.

DETAILED DESCRIPTION OF THE PREFERRED EMBODIMENTS

Figure 1:
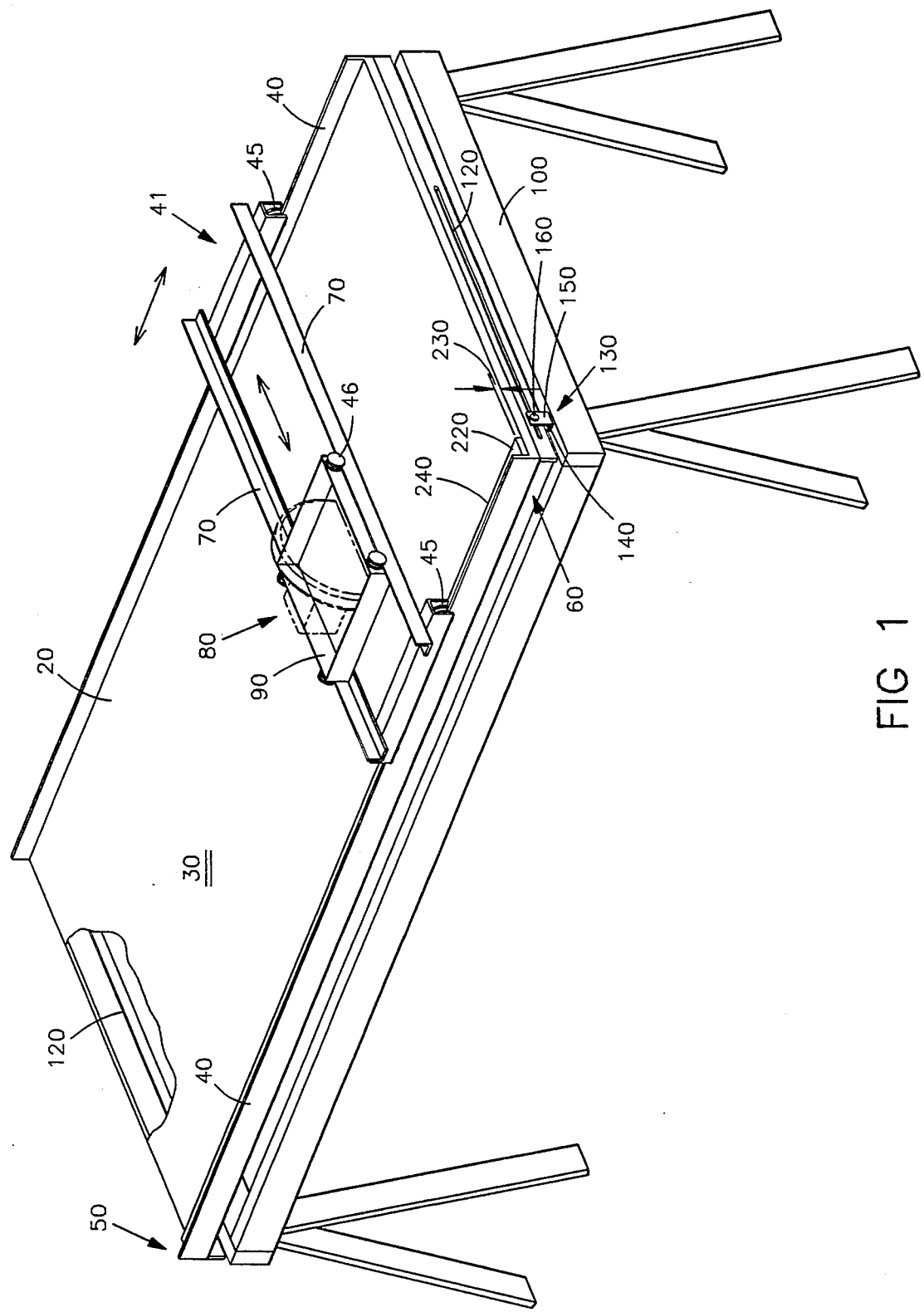
FIG. 1 is a perspective view of one embodiment of the saw table and guide of the present invention.

The instant invention is generally illustrated in FIG. 1 which shows an apparatus for cutting a sheet material workpiece shown as 10 in FIG. 3. It includes a table 20 having a flat work surface 30, a first track means 40 comprising a pair of tracks in spaced apart, parallel, relationship, and which are affixed to the table 20, a transverse carriage assembly 41 providing roller means 45 at opposing ends for engaging the first track means 40, the assembly being positionable and movable on the first track means 40. The carriage assembly includes a second track means 70 positioned orthogonally to the first track means 40. A saw carriage assembly 80 provides a saw support means 90 and roller means 46 adapted, with the saw carriage assembly 80 positioned for crosscut cutting, for engaging, positioning on, and moving over, the second track means 70. The saw carriage assembly 80 is alternately positionable at a selected position on the saw carriage assembly 80 for rip cutting, whereby the saw carriage assembly 80 remains stationary with respect to the transverse carriage assembly 41, while the transverse carriage assembly 41 moves over the first track means 40. The saw support means 90 includes a saw slot 250 for accepting a blade 260 of a powered saw 270, and first clamp means 280 for removably fixing the saw to the carriage assembly.

The table 20 preferably is mounted upon a base support 100, such as a set of workhorses or other scaffolding such that the table 20 is positioned at a convenient work height. The table 20 preferably has a pivotal engagement means 130 for pivotal attachment to the base support 100 such that the table 20 is positionable on the base support 100 with the flat work surface 30 facing upwardly. Alternately it is positionable with the flat work surface 30 at an angle to the horizontal to provide improved access to the saw 270, easier loading of the workpiece 10 and other related ergonomic aspects. An alternate interface (not shown) between the table 20 and the base support 100 includes a pair of rods mounted to the underside of the table so as to roll on the base support structure. With one of the rods mounted near the front-to-rear center of gravity of the table 20, the table 20 is easily tilted from the horizontal to any desired angle up to vertical, as dictated by the demands of the job. With the table 20 at a near vertical position, it becomes quite easy to lay a large piece of plywood onto the cutting work surface 30, and equally easy to then tilt the table 20 with the workpiece 10, back to the horizontal orientation. This construction therefore provides a means for easy mounting and dismounting of the workpiece 10.

The pivotal engagement means 130 preferably includes a pair of opposing slots 120 at each side of the table 20 for engaging a pair of spaced apart swivel pin assemblies 150 respectively, the pin assemblies 150 being attached to the base support 100, such that the table 20 is positionable at a selected horizontal position on the base support 100, the pin assemblies 150 slidably engaging the slots 120 so that the table 20 may be tipped into an inclined orientation at one side of the base support 100. The pin assemblies 150 preferably include a "U" shaped bracket having upward extending legs for engaging a straight pin 160 adapted for engaging the slot 120 in the side of the table 20 so that the table 20 may be positioned relative to the base support 100.

In one preferred embodiment, the first track means 40 includes a first pair of first vertical walls 170 (FIG. 4) each having a first top edge 180, and each roller means 45 of the transverse carriage assembly 41 is a pulley having parallel spaced apart side walls 200 for straddling one of the first vertical walls 170 and a hub 210 for rolling in contact with the top edge 180. An alternate preferred embodiment of the first track means 40 comprises a pair of "L" shaped rods 300 fixed at opposing edges 21 of the table 20. The roller means 45, in this embodiment, includes horizontally opposing sets of wheels 310 for engaging vertical surfaces 320 of the "L" shaped rods 300, and vertically oriented wheels 330 for supporting the weight of the transverse carriage assembly 41 upon horizontal surfaces 340 of the "L" shaped rods 300.

Again, in one preferred embodiment, the second track means 70 is a pair of second vertical walls 171 each having a second top edge 181, and each roller means 46 of the saw carriage assembly 80 is a pulley having parallel spaced apart side walls 200 for straddling one of the pair of the second vertical walls 171 and a hub 211 for rolling in contact with the top edge 181 thereof. In an alternate preferred embodiment (not shown), the pulleys of the saw carriage assembly are replaced by rollers mounted so as to support the saw support on horizontal surfaces of the transverse carriage assembly. The side walls of the saw support are adapted for moving in close proximity to the vertical walls of the second track means so that the saw moves in a straight line.

Figure 1B:
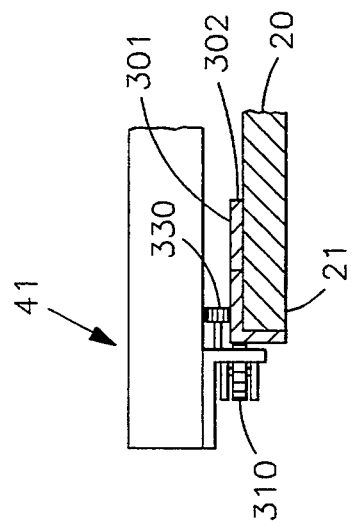
FIG. 1B is an elevational view of the disclosure of FIG. 1A showing in particular, the relationship between the table rail and the mounting of the carriage assembly of the present invention.
Figure 1A:
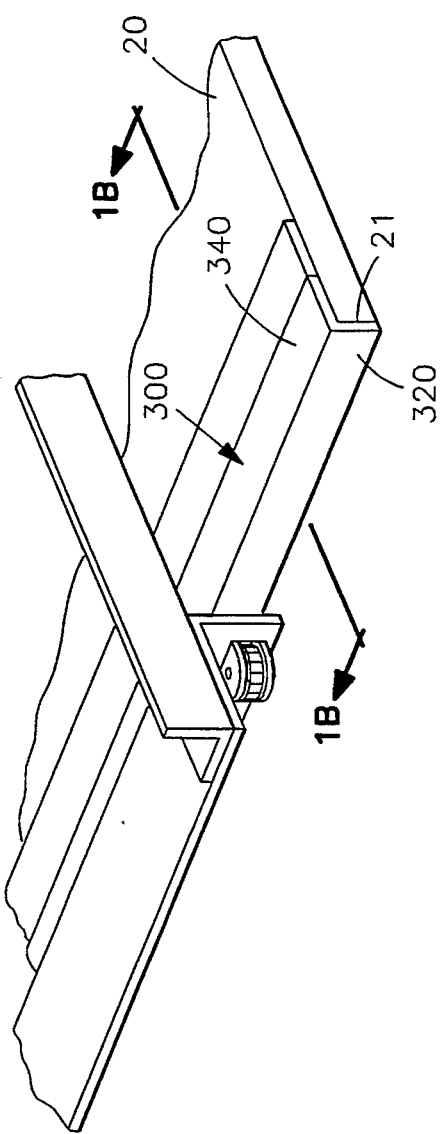
FIG. 1A is a partial perspective view of an alternate rail and roller systems of the present invention.
Figure 2C:
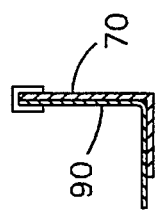
FIG. 2C is a section view of FIG. 2B.
Figure 2B:
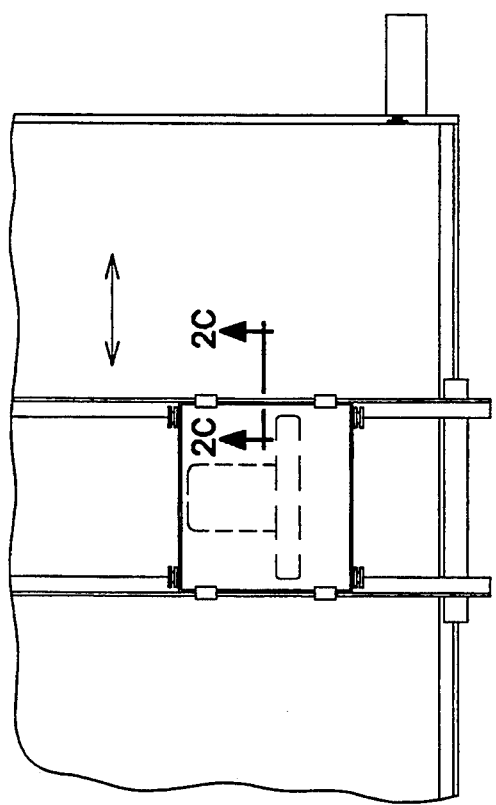
FIG. 2B is similar to FIG. 2A showing the rip mode of operation of the present invention.
Figure 2A:
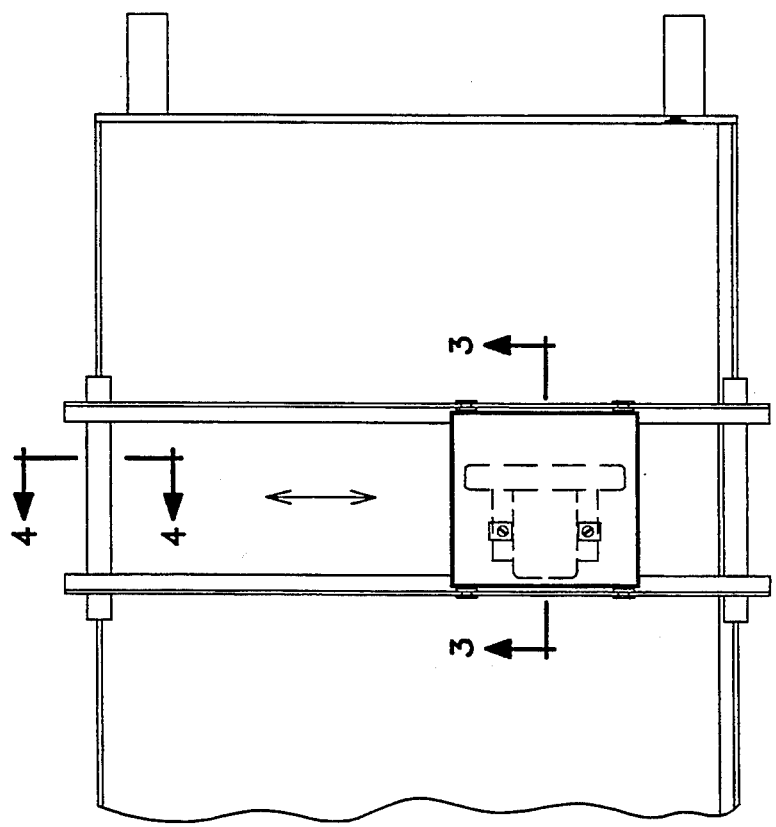
FIG. 2A is a plan view of the invention showing the crosscut mode of operation of the present invention.
Figure 5:
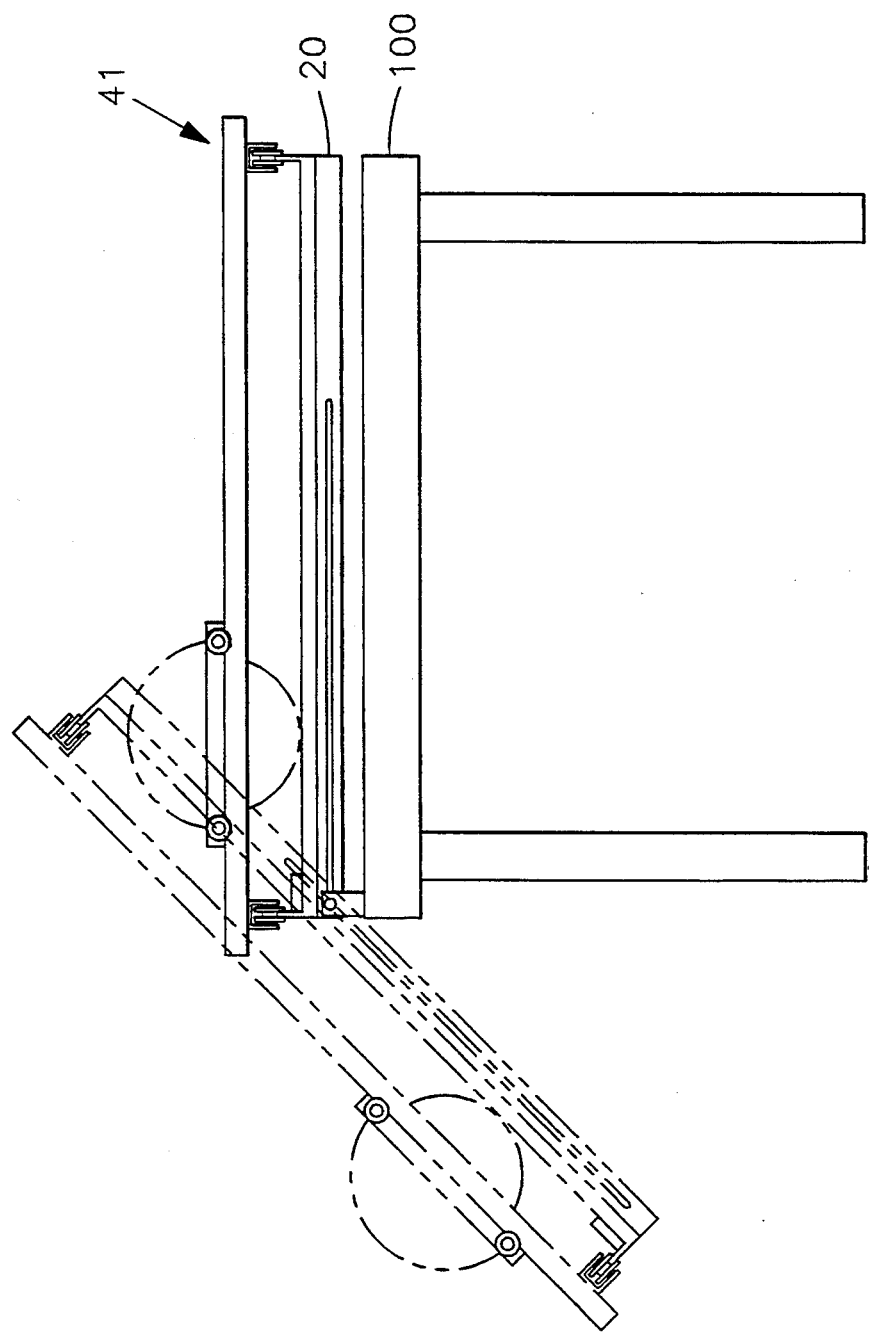
FIG. 5 is an elevational side view of the table shown positioned at an angle to the base.

In order to assure proper alignment of the workpiece 10 on the table 20, a panel rail guide 301 may be attached to the table 20 adjacent to one of the rails of the first track means 40. The panel rail guide 301 has a height low enough for the transverse carriage assembly 41 to pass it while providing a vertical reference surface 302 for abutting the workpiece 10 in order to achieve alignment (FIG. 1B).

In operation, the table 20 may be supported by the fixed base support 100, as previously described, or may be mounted on the side of a truck or other vehicle (not shown). Truck mounting is desirable for use of the tool in the field. In this case the table 20 is transported in a near vertical orientation and is able to swing downwardly to a near horizontal position for use while being still supported by the truck. No matter where or how the table 20 is supported, it is used by placing a workpiece 10, preferably, a sheet of wood, or other material, having a constant thickness, onto the work surface 30 with one edge of the workpiece abutting the workpiece guide 301. For crosscutting, the saw 270 is clamped into the saw support means 90 such that the saw blade 260 is positioned to traverse the workpiece 10 toward and away from the operator. The transverse carriage assembly 41 is clamped into a fixed desired position on the first track means 40, and the saw carriage assembly 80 is then moved along the transverse carriage assembly 41 for cutting the workpiece 10. The second track means 70 guides the roller means 46 of the saw carriage assembly 80 so that a straight cut is made in the workpiece 10.

For rip cutting, the saw 270 is clamped, again, into the saw carriage assembly 80, but this time the saw carriage assembly 80 is clamped to the transverse carriage assembly 41 so that the saw blade 260 is oriented for ripping and the saw carriage assembly 80 cannot move relative to the transverse carriage assembly 41. In this mode the saw carriage 80 does not move along the transverse carriage assembly 41, but instead moves with it as the transverse carriage assembly 41 is rolled along the first track means 40. The cut in the workpiece 10 is made from one side of the operator to the other, in either direction.

While the above description contains many specific details, these should not be construed as limitation on the scope of the invention but rather as an application of preferred embodiments thereof. Further embodiments will be reduced to practice by those of average skill in the art in accordance with the principles of the following claims.

What is claimed is:

1. A saw table and guide for cutting a sheet material workpiece, comprising:
   a table having a flat work surface;
   a first horizontal track means comprising a first pair of tracks in spaced apart, parallel, relationship affixed to the table;
   a transverse carriage assembly providing roller means at opposing ends thereof engaging the first track means for rolling thereon, the roller means and the assembly being positionable and movable on the first track means, the assembly further including a second track means comprising a second pair of tracks in spaced apart parallel relationship connected to the roller means and positioned in orthogonal relationship to the first track means;
   a saw carriage assembly providing a saw support means and a further roller means at opposing ends thereof engaging, and moving over, the second track means, the saw carriage assembly being positionable at any selected position on the transverse carriage assembly for rip cutting;
   a base support positioned at a convenient work height and having a pair of upwardly extending pin assemblies for pivotal and sliding attachment of the table to the base support with the flat work surface generally facing upwardly, the table including a pair of opposing slots for engaging the pair of upwardly extending pin assemblies respectively, the pin assemblies slidably engaging the slots such that the table is positionable at a desired horizontal position on the base support, the table being rotatable about the pin assemblies so that the table is positionable in an inclined orientation at a side of the base support to provide improved access to the table.

2. The saw table and guide for cutting a sheet material workpiece of claim 1 wherein the pin assemblies each include a "U" shaped bracket having upward extending legs for engaging a straight pin therethrough.

3. The saw table and guide for cutting a sheet material workpiece of claim 1 wherein the first track means comprises a first pair of first vertical walls each having a first top edge, and each roller means of the transverse carriage assembly is a pulley having parallel spaced apart side walls engaged straddlingly over a respective one of the first vertical walls and, each roller means has a hub sandwiched between the side walls rolling in contact with a respective one of the first top edges thereof.

4. The saw table and guide for cutting a sheet material workpiece of claim 1 wherein the second track means is a pair of second vertical walls each having a second top edge, and each further roller means of the saw carriage assembly is a pulley having parallel spaced apart side walls engaged straddlingly over a respective one of the pair of second vertical walls and each further roller means has a hub sandwiched between the side walls rolling in contact with a respective one of the second top edges thereof.

5. The saw table and guide for cutting a sheet material workpiece of claim 1 further including a panel rail guide attached to the flat work surface, the panel rail guide having a height such that the transverse carriage assembly passes over the panel rail guide without interference, the rail guide providing a reference surface for alignment of the workpiece.

6. The saw table and guide for cutting a sheet material workpiece of claim 1 wherein the saw support means includes a saw slot for accepting a blade of a powered saw, and first damp means for removably fixing the saw to the carriage assembly.

* * * * *